United States Patent [19]

Tomatis

[11] Patent Number: 4,592,274
[45] Date of Patent: Jun. 3, 1986

[54] STRETCHING AND MOULDING MACHINE FOR PASTA FILATA CHEESE

[75] Inventor: Stefano Tomatis, San Lorenzo di Peveragno, Italy

[73] Assignee: CMT Costruzioni Meccaniche e Tecnologie S.p.A., Milan, Italy

[21] Appl. No.: 725,164

[22] Filed: Apr. 23, 1985

Related U.S. Application Data

[63] Continuation of Ser. No. 606,130, May 2, 1984, abandoned.

[30] Foreign Application Priority Data

May 3, 1983 [IT] Italy ............................ 67476 A/83

[51] Int. Cl.[4] ............................................ B29C 55/00
[52] U.S. Cl. ............................. 99/452; 366/69; 425/200; 425/296; 425/325; 425/327
[58] Field of Search ..................... 366/69, 156, 279; 425/202, 296, 383, 200, 208, 324.1, 327, 325; 426/583; 99/452, 456, 460, 461, 462, 465, 466

[56] References Cited

U.S. PATENT DOCUMENTS

| 3,727,308 | 4/1973 | Ross | 425/202 |
| 4,182,232 | 1/1980 | Tomatis | 426/583 |
| 4,392,801 | 7/1983 | Meyer | 425/296 |

FOREIGN PATENT DOCUMENTS

| 2453165 | 5/1976 | Fed. Rep. of Germany | 425/202 |
| 2601359 | 8/1976 | Fed. Rep. of Germany | 425/202 |
| 2290146 | 9/1976 | France | 425/202 |

*Primary Examiner*—Willard E. Hoag
*Attorney, Agent, or Firm*—Cushman, Darby & Cushman

[57] ABSTRACT

The machine continuously produces pasta filata cheese by stretching curds while adding hot water then moulding the pasta filata obtained into cheese such as mozzarella, provolone, etc.

The curds are sprayed with hot water by nozzles (52, 55) and are pushed by twin augers (53) along a channel (54) into a vertical, substantially cylindrical stretching chamber (68) where a rotating stretching swift (74, 79) having radially projecting, arched paddles (79) stretches the curds into pasta filata against the reaction of a stationary, wall-mounted paddle (78). This spills over a partition (72) onto other augers (57) that feed the pasta filata to moulding means.

The moulding means preferably comprise a rotating moulding drum (90) having surface cavities (99), against which pasta filata is pushed through apertures (94) in a distributor block (92). A piston mould (100) mounted on a slide (98) for reciprocating motion between a filling position and a delivery position is also preferably provided as an alternative.

9 Claims, 5 Drawing Figures

STRETCHING AND MOULDING MACHINE FOR PASTA FILATA CHEESE

This is a continuation of application Ser. No. 606,130, filed May 2, 1984, which was abandoned upon the filing hereof.

BACKGROUND OF THE INVENTION

This invention relates to a stretching and moulding machine for the production of both soft and hard pasta filata cheese, such as mozzarella, provolone and the like.

In the production of pasta filata cheese, curds are made plastic by mixing them with hot water, having a temperature in the range 70° to 90° C., and then kneading or stretching the mix to obtain the so-called "pasta filata". The chemio-physical action of hot water and the mechanical action of stretching together induce a structural transformation of the casein molecule, giving the pasta filata peculiar properties of stringiness that typify this kind of products. The pasta filata thus obtained is then moulded into desired shapes, either by manual shaping or by pouring into moulds.

The processing of pasta filata, which used to be done in the past by stirring curds and hot water manually with a kneading paddle in open vats, has more recently been mechanized. Continuous auger stretching machines came into general use and, more recently, continuous stretching machines having reciprocating plunger arms, as known from U.S. Pat. No. 4,182,232.

While stretching machines according to said U.S. patent have the ability to effectively simulate manual stretching, by pulling pasta filata apart and thus producing a satisfactory "soft" pasta filata, having a high water content, as required for Italian mozzarella, bocconcino, and the like, their mechanism is complex, bulky and expensive to manufacture. Also, such prior machines are difficult to clean, because they include tunnels or chambers that are not readily accessible.

Further, while prior machines using stretching augers are suitable for "hard" cheese such as provolone, they are unsuitable for soft cheese, because they squeeze the product, thus tending to expel water from it. On the other hand, machines using reciprocating plunging arms according to said U.S. patent are only suitable for soft pasta filata, and cannot be satisfactorily employed in the production of hard cheeses.

SUMMARY OF THE INVENTION

Therefore, it now is the main object of the invention to provide a stretching and moulding machine for the production of pasta filata cheese, which overcomes such drawbacks, being compact, relatively cheap, easy to clean, and adapted to process both soft and hard pasta filata.

The invention achieves such object by means of a stretching and moulding machine for the continuous production of pasta filata cheese, wherein curd-dicing means feed diced curds to continuous stretching means adapted to transform the curds into pasta filata with the addition of hot water and to feed the pasta filata to associated moulding means, characterized in that the stretching 20 means comprise:

(a) a horizontal, open channel having a closed reception end adapted to receive curds from the curd-dicing means and an opposite, open delivery end adapted to deliver pasta filata continuously to the moulding means;

(b) a substantially cylindrical stretching chamber extending vertically upwards from a middle portion of the channel, having a tunnel communicating with the closed reception end of the channel, and an overflow toward the open delivery end of the channel;

(c) a pair of parallel shafts extending longitudinally in the channel and passing through said tunnel, bearing integral first augers extending from the closed end of the channel to about the middle of the stretching chamber, the parallel shafts being provided with driving means mounted externally to the channel;

(d) a vertical swift, rising from the bottom of the channel in the center of the stretching chamber, comprising a shaft provided with radially projecting paddles, the shaft being provided with driving means mounted underneath the channel;

(e) a stationary paddle projecting radially inward from the wall of the stretching chamber, in interlaced relationship with the paddles of the swift; and (f) water injecting means adapted to inject hot water into the channel.

BRIEF DESCRIPTION OF THE DRAWINGS

The invention is further described with reference to a preferred embodiment, shown in the annexed drawings, in which.

DESCRIPTION OF A PREFERRED EMBODIMENT

Figure 1:
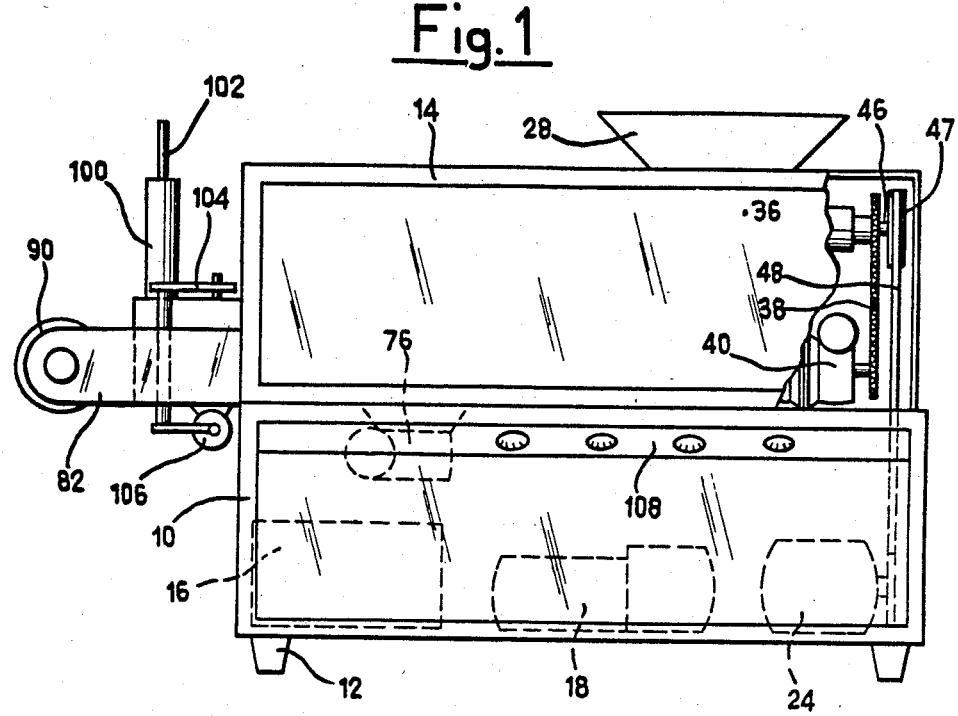
FIG. 1 is a front view of a stretching-moulding machine according to the preferred embodiment.

With reference to the figures of the drawings, the stretching-moulding machine according to the preferred embodiment of the invention comprises a block-shaped base 10 mounted on adjustable screw feet 12, and a frame 14, having substantially the same shape, rigidly supported on the base. A conventional hydraulic power unit is mounted within the base 10, substantially comprising an oil tank 16, a compressor 18 including an electric motor, and a variety of fittings such as pipes, valves, etc., all as known in the art, and therefore not further described or shown, for the sake of brevity. The hydraulic power unit is adapted to supply hydraulic power to drives that will be described hereinafter. Two pumps (not shown in the drawings and not belonging to the invention) are further provided for the supply of hot water and for the draining of used water, respectively, as known per se in this kind of machines. An electric motor 24 is further provided in the base 10 for purposes to be explained hereinafter.

Frame 14 supports a trough-shaped loading chamber 26, which is provided with a removable hopper 28, and which is bounded by two vertical plates 30, 32, integral with frame 14. An auger 34 having a hollow shaft is received within the chamber 26, and is rotatably supported in a collar 36, by means of a ball bearing not visible in the drawings. Collar 36 is flange-mounted on plate 30. Auger 34 is driven through a chain transmission 38 by a hydraulic drive 40, flange-mounted on plate 30 and energized by power unit 16, 18, through a control valve not shown.

The other end of chamber 26 opens into a cylindrical casing 42, in which a curd-dicing cutter 44 is rotatably supported. The cutter 44 comprises a slotted disk having radial blades and is mounted on a shaft 46 received within the hollow shaft of auger 34. A pulley 47 is keyed on the other end of shaft 46 and is driven by motor 24 by way of belts 48. The outer end of casing 42 is protected by a removable cowling 50, adapted to divert downwardly the diced product delivered by cutter 44 (as explained hereinafter).

Frame 14 supports a trough-shaped channel 54 of metal sheet, extending from a closed reception end 49 at plate 32 on the opposite side of the loading chamber 26, for the entire length of the machine, to an open delivery end 51. Channel 54 has a jacket 62 having an inlet manifold 64 and an outlet manifold 66, for the circulation of hot water.

Figure 4:
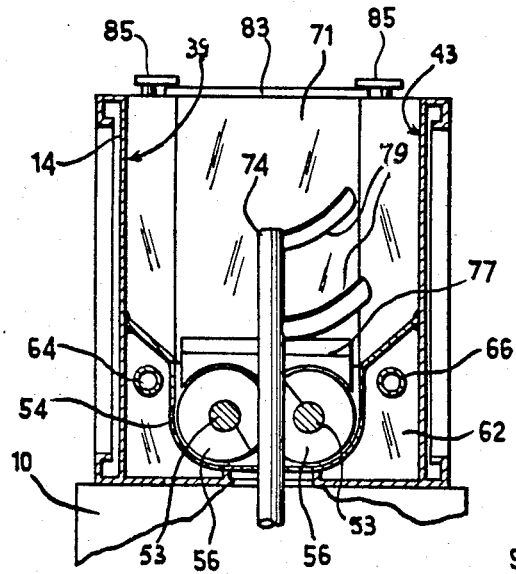
FIG. 4 is a view in transverse cross-section, made along the line IV—IV of FIG. 3.
Figure 5:
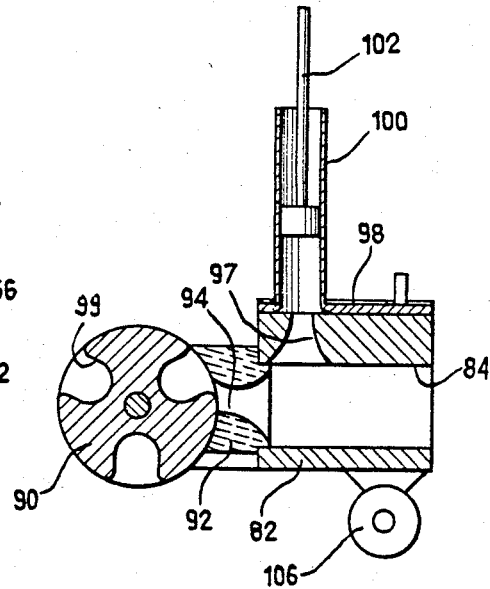
FIG. 5 is a view in longitudinal cross section, to an enlarged scale, of a preferred moulding section incorporated into the machine of FIG. 1.

Respective vertical walls 39, 43 of steel sheet extend upwards from the sides of channel 54 (see FIG. 4), being welded to the edges of the channel and shaped in such a way as to form a first enclosure 41 near the cutter 44, a second enclosure or stretching chamber 68 near the first enclosure, and a third enclosure 70 near the stretching chamber, at the far end of channel 54.

Walls 39, 43 are curved around the stretching chamber 68 in the shape of segments of a circular cylinder with a vertical axis, so that inward projections are defined between each of enclosures 41, 70 and the stretching chamber 68, respectively, said projections having respective vertical, opposite grooves, adapted to receive movable partitions 71 and 72, between each of enclosures 41, 70 and the stretching chamber 68, respectively.

Partition 71 is a rectangular metal sheet having an integral, generally prismatic shoe 73 at its bottom end. Shoe 73 extends horizontally toward the middle of stretching chamber 68, with a gently sloping upper surface 77, while the rear upper surface 75 (toward cutter 44) is short and steep. At its upper edge, partition 71 has an integral bar 83 projecting at its ends beyond the sides of the partition, to be engaged by releasable clamps 85, adapted to prevent undesired lifting of the partition.

Partition 72 is a simple rectangular metal sheet extending to about mid-height of stretching chamber 68, to act as an overflow, for purposes explained hereinafter.

Two parallel shafts 53 extend in channel 54 and are driven by a hydraulic drive 60 through a coupling 59 and a transmission gear 65, drive 60 also being mounted on vertical plate 30. Shafts 53 bear integral augers 56 extending from plate 32 to about the middle of the stretching chamber 68. The under surface of shoe 73 is shaped as a twin barrel vault, so as to define, together with channel 54, a tunnel 69 surrounding the augers 56 for a limited length.

Shafts 53 extend further beyond the end wall of enclosure 70, and carry augers 57 in such enclosure. Augers 57 preferably have a shorter pitch than augers 56, say in the ratio 1:2. At partition 72, shafts 53 lie on supports 59 integral with channel 54, and the partition has notches at its bottom edge to allow for passage of such shafts.

In the space between the augers 56 and 57, shafts 53 have respective longitudinal, radial fins 61, placed at right angles to each other.

A vertical shaft 74 extends upwardly in the center of stretching chamber 68 from a sealed bore in its bottom. Shaft 74 is driven by a hydraulic drive 76 mounted beneath channel 54. Shaft 74 carries two integral, arched paddles 79, each sloping upwards, to form a stretching "swift". From the wall of stretching chamber 68, a stationary paddle 78 projects toward the middle of the chamber, interlaced with paddles 79. The direction of rotation of drive 76 is reversible, so that swift 74, 79 can be driven clockwise or counterclockwise at will, for purposes explained hereinafter.

Several water-injectors are provided for the injection of hot water into the curd-processing area comprising enclosures 41, 68 and 70. Two nozzles 52 and 55 are provided in the bottom of channel 54, i.e. in enclosure 41 and in the middle of tunnel 69, respectively, while a third injector is represented by the stationary paddle 78 itself, which is hollow and perforated laterally with small holes (not visible in the drawings), and communicates with the hot water system at its connection with the wall of stretching chamber 68. The flows of hot water to the several outlets can be metered by means of control valves (not shown), which are adjustable through knobs on a control ledge 108.

A grid-covered aperture 80 is provided in the wall 39 of the stretching chamber for draining spent water, such aperture preferably leading to an exhaust pump not shown. Alternatively, a draining aperture could be provided in the wall of enclosure 41.

The delivery end 51 of channel 54 opens, through a port in the end wall of enclosure 70, into a moulding section 82 that can be of any desired type. A preferred, two-function embodiment will now be described.

Moulding section 82 comprises a body having an internal passage 84 extending from the delivery end of channel 54, and having two arms or projections 86, 88, between which a cylindrical moulding drum 90 is rotatably supported. Moulding drum 90 has cavities 99 in its surface. A distributor block 92, of such plastic material as polytetrafuoroethylene or similar material, is interposed between the internal passage in body 82 and drum 90, with apertures such as 94 partially aligned axially with the cavities in the drum. The drum is driven by a hydraulic drive 96 located in arm 86.

A tapering port 97 opens in the roof of passage 84. A slide 98 carrying a vertical, cylindrical piston mould 100 is mounted on the body 82. A piston 102 is slidably received in the cylindrical mould. A crank and slotted link 104, driven by a hydraulic jack 106 mounted underneath body 82, is adapted to operate slide 98 between a filling position where mould 100 is aligned 5 with port 97 and a delivery position where mould 100 hangs outwardly from the end of body 82. When the slide 98 is in use, drum 90 and distributor block 92 are removed and replaced with a wedge (not shown) adapted to shut the end of passage 84 and to divert the flow of pasta filata to port 97 and to the cylindrical mould, as explained hereinafter.

All hydraulic drives in the machine are controlled by means of conventional control valves (not shown), whose control knobs are grouped on the control ledge 108.

The above-described machine is operated as follows. Hot water is preliminarily admitted to jacket 62, in order to preheat the work area of the machine. Hot water is also admitted to nozzles 52 and 55 in the bottom of channel 54 and to the stationary paddle 78 of stretching chamber 68. Curds are then loaded in hopper 28, after starting auger 34 and cutter 44. Swift 74 is also set in motion.

The diced curds falling from cutter 44 into the reception end of channel 54 are watered from nozzle 52 and are then fed forward in channel 54 by twin augers 56, passing through tunnel 69 underneath shoe 73, and they then enter the stretching chamber 68 where they are pre-stretched by radial fins 61.

Curds are continuously fed by augers 56, and are gradually transformed into pasta filata by the combined action of pre-stretching and hot water. As the pasta filata rises in the stretching chamber, it comes under the action of the swift, whose paddles 79 further stretch it against the reaction of stationary paddle 78. Hot water is sprayed from the stationary paddle into the core of the mass, thus uniformly and thoroughly heating and soaking it. The pasta filata thus rises in the stretching chamber as a round, coherent mass, and eventually overflows the edge of partition 72, spilling onto augers 57 in enclosure 70. Augers 57 feed the pasta filata out of the delivery end 51 into moulding section 82, which at this stage will have been started. Water flow to the different nozzles can be adjusted to obtain the kind of product desired.

Figure 2:
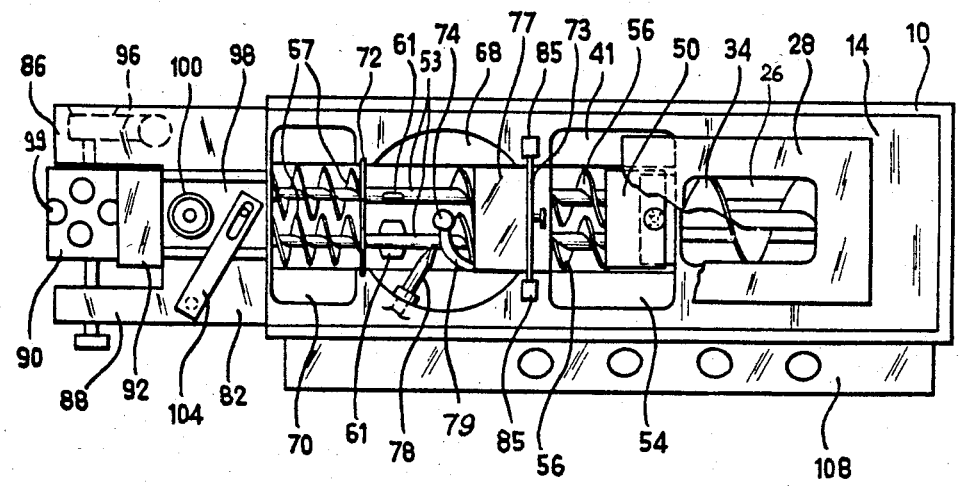
FIG. 2 is a plan view of the machine of FIG. 1.
Figure 3:
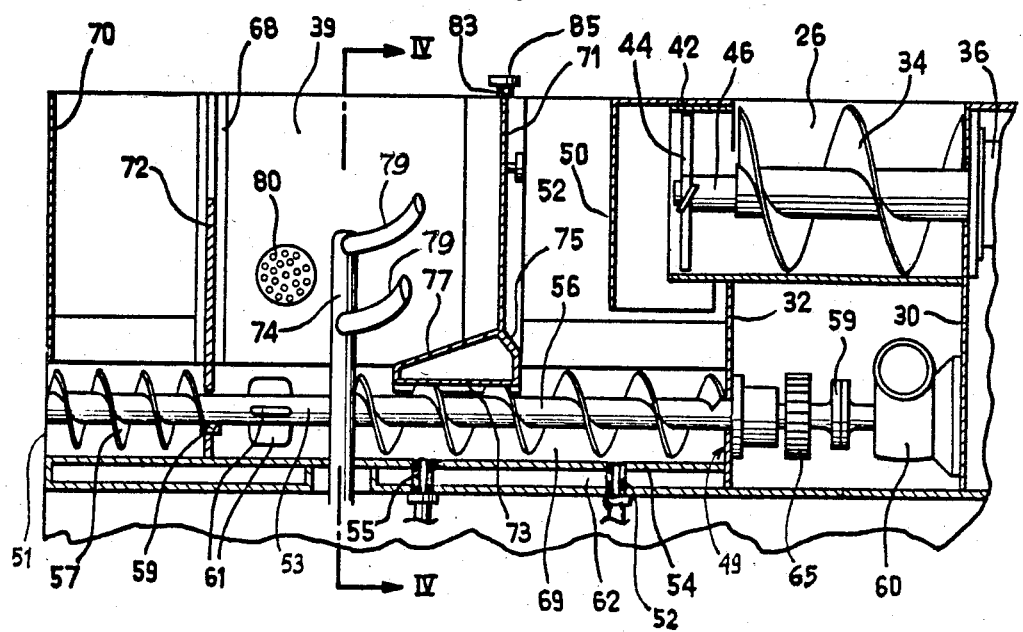
FIG. 3 is a view in longitudinal cross-section, to an enlarged scale, of a portion of the machine of FIGS. 1 and 2.

If the rotation of the swift is counterclockwise as seen in the plan view (FIG. 2), paddles 79 will stretch the pasta filata outwardly and upwardly, thus letting pasta filata absorb more water to obtain a soft product, suitable for the production of mozzarella. If the rotation is clockwise, the paddles draw the pasta filata inwardly, thus twisting and squeezing it into a harder product, suitable for the production of provolone and the like.

If the moulding section is set up for drum moulding, the pasta filata is propelled through the apertures of distributor block 92 into cavities 99 of the drum. As the drum rotates, fresh cavities come into alignment with the distributor block, while the filled cavities come to an emptying position where the pasta filata drops out in form of round pieces, which are forwarded to chilling means known per se and not pertaining to the invention.

If the moulding section is set up for cylinder moulding, the pasta filata will be diverted through port 97 and into mould 100, filling it until piston 102 actuates a limit switch not shown, thus enabling the operation of jack 106. Slide 98 will then be shifted out to its delivery position by the crank and slotted link 104, and a cylindrical piece of product will drop out of the mould under the weight of the free piston, to be collected and chilled by conventional means, not belonging to the invention. Slide 98 will return to its filling position after a time delay set by a conventional timer (not shown).

At the end of a work session, loading of curds to the machine is stopped, and the mass of pasta filata in the stretching chamber will eventually be unable to overflow onto the delivery augers. Partition 72 will then be removed, so that the residual pasta filata can also be fed to the moulding section.

The machine can then be cleaned by conventional means, after also removing partition 71, so that the entire processing area is fully accessible and inspectable. Cowling 50 can also be removed for inspection or cleaning of the cutter.

It should be understood that several modifications can be made to the preferred embodiment described above. The moulding section can be replaced with other known continuous moulding means, or the curd-dicing cutter can be replaced with other equivalent means. Additional water injectors can be provided.

Also, the stretching paddles of the swift, as well as the stationary paddle, can vary in number, position or shape.

All the above and other modifications should be regarded as being comprised within the scope of the invention, as defined in the attached claims.

I claim:

1. A stretching and moulding machine for the continuous production of pasta filata cheese, having curd-dicing means to feed diced curds to continuous stretching means for transforming the curds into pasta filata with the addition of hot water and to feed the pasta filata to moulding means, characterized in that the stretching means comprise:

(a) a horizontal, open channel having a closed reception end to receive curds from the curd-dicing means and an opposite, open delivery end to deliver pasta filata continuously to the moulding means;

(b) a substantially cylindrical stretching chamber extending vertically upwards from a middle portion of the channel, having a tunnel communicating with the closed reception end of the channel, and an overflow toward the open delivery end of the channel;

(c) a pair of parallel shafts extending longitudinally in the channel and passing through said tunnel, bearing integral first augers extending from the closed end of the channel to about the middle of the stretching chamber, the parallel shafts being provided with driving means mounted externally to the channel;

(d) a vertical swift rising from the bottom of the channel in the center of the stretching chamber, comprising a shaft bearing radially projecting paddles, the shaft being provided with driving means mounted underneath the channel;

(e) a stationary paddle projecting radially inward from the wall of the stretching chamber, in interlaced relationship with the paddles of the swift; and (f) water injecting means adapted to inject hot water into the channel.

2. The machine of claim 1, further characterized in that said overflow is a first movable partition.

3. The machine of claim 2, further characterized in that it comprises a second movable partition opposite to said first movable partition, and having at its bottom a prismatic shoe overhanging the first augers and defining said tunnel.

4. The machine of claim 1, further characterized in that the paddles of the swift are arched and inclined upwardly.

5. The machine of claim 1, further characterized in that the stationary paddle is hollow, is perforated and is connected to an external water supply.

6. The machine of claim 1, further characterized in that the parallel shafts have respective pairs of diametrically opposite radial fins at right angles to each other.

7. The machine of claim 2, further characterized in that the parallel shafts extend beyond the first movable partition through apertures, and carry respective second augers extending from the partition to the open end of the channel.

8. The machine of claim 7, further characterized in that said moulding means comprise:

(a) a body rigidly attached to the machine at the open delivery end of the channel, and provided with a pair of integral projecting arms, and having a passage extending from the open end of the channel to an area between said projecting arms;

(b) a cylindrical moulding drum having cavities on its surface and rotatably supported between said projecting arms;

(c) a distributor block between the opening of the passage and the drum, having apertures at least partially aligned with said cavities; and (d) first driving means mounted on the body and adapted to drive the moulding drum.

9. The machine of claim 8, characterized in that the moulding means further comprise:

(a) a slide mounted on the upper surface of the body and carrying a vertical, cylindrical mould in which a slidable piston is received, the body having an aperture in the roof of the passage;

(b) second driving means mounted on the body and adapted to drive reversibly said slide between a filling position where said cylindrical mould is aligned with the aperture in the roof of said passage and a delivery position where the cylindrical mould overhangs from the body over the space between said projecting arms.

* * * * *